United States Patent
Molerus et al.

[11] Patent Number: 5,855,965
[45] Date of Patent: Jan. 5, 1999

[54] PROCESS FOR THE PRODUCTION OF A POWDER COATING, APPARATUS FOR CARRYING OUT THE PROCESS, AND POWDER FORMULATION FOR CARRYING OUT THE PROCESS

[75] Inventors: Otto Molerus, Hemhofen; Karl-Ernst Wirth, Happurg; Christopher Hilger; Joachim Woltering, both of Münster; Heinrich Wonnemann, Telgte, all of Germany

[73] Assignee: BASF Lacke +Farben, AG, Muenster-Hiltrup, Germany

[21] Appl. No.: 859,921

[22] Filed: May 21, 1997

Related U.S. Application Data

[63] Continuation of Ser. No. 428,167, filed as PCT/EP93/03025 Oct. 29, 1993, abandoned.

[30] Foreign Application Priority Data

Nov. 6, 1992 [DE] Germany .......................... 42 37 594.0

[51] Int. Cl.$^6$ ................. B05D 1/06; B05D 1/34
[52] U.S. Cl. ............ 427/475; 427/180; 427/190; 427/421; 427/426; 106/287.24; 106/287.25
[58] Field of Search ..................... 427/180, 190, 427/421, 426, 475, 483; 118/302, 308; 106/287.24, 287.25

[56] References Cited

U.S. PATENT DOCUMENTS

| | | | |
|---|---|---|---|
| 4,413,021 | 11/1983 | Hentschel et al. | 427/236 |
| 5,106,659 | 4/1992 | Hastings et al. | |
| 5,171,613 | 12/1992 | Bok et al. | |
| 5,196,049 | 3/1993 | Coombs et al. | |
| 5,233,022 | 8/1993 | Donatti et al. | |
| 5,362,519 | 11/1994 | Argyropoulos et al. | |
| 5,415,897 | 5/1995 | Chang et al. | 427/421 |

FOREIGN PATENT DOCUMENTS 0 421 796 A2  4/1990  European Pat. Off. .

OTHER PUBLICATIONS

Derwent AB J57044688, "Sealing Pipes Using Cyanoacrylate–dimethacrylate Composition," one page, No date.

*Primary Examiner*—Shrive Beck
*Assistant Examiner*—Fred J. Parker

[57] ABSTRACT

The present invention relates to a process for the production of a powder coating, in which a suspension of powder particles is sprayed and the spray jet is directed onto the substrate to be coated, characterized in that 1.) a suspension of powder particles in a liquefied gas is employed, the gas having been liquefied under a pressure of not more than 20 bar, and
2.) the liquid gas is vaporized before, during or after the spraying of the suspension.

25 Claims, No Drawings

PROCESS FOR THE PRODUCTION OF A POWDER COATING, APPARATUS FOR CARRYING OUT THE PROCESS, AND POWDER FORMULATION FOR CARRYING OUT THE PROCESS

This is a continuation of U.S. patent application Ser. No. 08/428,167, filed Jun. 19, 1995, abandoned which is a national phase filing of PCT/EP93/03025, filed Oct. 29 1993.

FIELD OF THE INVENTION

The invention relates to the powder coating of, in particular, thin-walled metal components of large surface area, and above all car bodies.

BACKGROUND AND SUMMARY OF THE INVENTION

For a wide variety of areas of application, pulverulent substances are required which have extremely low particle sizes of less than about 20 microns ($\mu$m). It is frequently problematic in the case of fine-particled powders of this type that these materials are difficult to handle and, in particular, problems occur with respect to their flowability. Another particular problem is the production of coatings using these fine-particled powders. One example of such an area of application is the sector of catalyst technology, in which the active substances, in addition, have to be introduced into fine pores in the support materials.

A further important area of application for fine-particled pulverulent substances is that of powder coatings, which are gaining increasing importance.

Conventional coating procedures, in which colored pigment particles dispersed in a conventional liquid solvent are sprayed in the form of paint droplets onto the components to be coated, represent considerable environmental pollution because of the contamination of the exhaust air, which is concentrated during, for example, the line production of passenger cars.

In the interests of improved environmental protection, three kinds of coating have been developed for more environmentally friendly spray coating (R. Laible, Umweltfreundliche Lackiersysteme für die industrielle Lackierung [Environmentally Friendly Coating Systems for Industrial Coating], Expert Verlag, Esslingen, 1988), namely high-solids coatings, water-borne coatings and powder coatings.

High-solids coatings are essentially none other than normal coatings which have been thickened; in other words, the emissions into the surrounding air of solvents of which some are harmful are reduced, but not eliminated. Waterborne coatings have the disadvantage that the overspray in the water has to be recovered. Powder coatings lead neither to significant contamination of the air nor to polluting contamination of water. In its current state of development, however, this process has a number of disadvantages which stand in the way of its broad application, especially in the sector of the thin coating of thin metal components of large surface area, for example vehicle bodies.

The principle of electrostatic powder coating, which has been introduced since 1965, is very simple. A powder coating comprises particles of colored powder dispersed in air which have a particle-size range of from 20–60 $\mu$m with average particle sizes of from 40–50 $\mu$m. When dispersed in air (fluidized), such powder coating particles have the flow characteristics of a fluid. This property is the reason why they can be used in spray painting. They are charged in special electrostatic spray guns and sprayed onto an earthed workpiece to which they adhere electrostatically. Particles of powder coating which have been sprayed past the workpiece and have not been deposited are suctioned off, separated from the air, screened and re-used.

The advantages of powder coating are consequently that virtually no environmental pollution occurs and that the utilization of material which can be achieved, by dry suction and separation, is very good, since overspray is recovered without troublesome residues.

The ability to utilize this powder coating technology is, however, restricted to the application of relatively thick coats of at least 70 $\mu$m since, in order to have a smooth surface, the coat must be at least about 70 $\mu$m thick, and it is not possible to process relatively fine particles using this process without encountering problems.

Known powder coatings belong to a class of bulk material which is capable of holding air. Its characteristics are as follows: a bed of particles of material—cracking catalysts being a typical example—expands on fluidization (fluidized bed) distinctly above the minimum fluidization, before air bubbles start to form in the fluidized bed. If the supply of air is cut off suddenly, then the bed collapses slowly at a rate of from 0.3–0.6 cm/s, corresponding to the empty-tube velocity in the suspension phase.

A type of bulk material comprising particles below about 20 $\mu$m, which includes materials which are noticeably cohesive, i.e. in which the adhesive forces between the particles significantly exceed the other possible forces in the fluidized bed, namely weight and flow resistance, permits more or less poor fluidization only with the additional use of, for example, mechanical stirrers, although hardly achieving true dispersion of the particles.

Powder coatings have a solids density of about 1500 kg/m$^3$. At atmospheric pressure, the density of air is negligible. Only a particle-size distribution of the powder coatings within the range between 20 $\mu$m and 60 $\mu$m guarantees that powder coatings will be in the region of the excellent fluidization properties required. The consequence of this lower particle-size limit is, therefore, that it is not possible to go below certain minimum layer thicknesses, and that high surface quality, leveling and gloss are only achieved at layer thicknesses >70 $\mu$m, i.e. with high paint consumption and thick coats of paint.

A significantly broadened range of applications for the known powder coating technology in order to give thinner coatings of high quality would necessitate powder coating particles of an unsuitable bulk material type containing particles below about 20 $\mu$m. Prior-art powder coating technology is therefore denied access on physical grounds to desirable low particle size ranges. Important areas of application—for example catalyst production, in which the active substance is introduced into the pores of a support substance—are also closed to this technology.

Moreover, present-day powder coating technology is restricted to a number of selected binder/curing agent systems because, for example, reactive systems are not accessible to powder coating technology. For instance, it is not possible to formulate powder coatings as two-component systems in which the curing agent and the binder are stored separately and are mixed only shortly before application. In fact, to obtain homogeneous powder coatings, specific process steps are necessary in the production of the powder coatings. Conventionally the powder coating is first extruded and is only then ground, so as to guarantee a homogeneous distribution of the individual components of the powder coating. In contrast, it is not possible to produce a powder coating having homogeneous distribution of the individual components simply by dispersing them. Consequently, it is not possible to produce powder coatings at the actual premises of the user from a binder component and a curing-agent component. It is for this reason that it is not possible to formulate powder coatings which contain components which are reactive at ambient temperature, for example OH group-containing binders and curing agents which are reactive at ambient temperature and are based on free isocyanate groups.

In addition, the extrusion step which is necessary in the conventional processes for the production of powder coatings is time-consuming and cost-intensive. Furthermore, in the case of reactive systems, it is quite possible for problems to occur during extrusion (premature reaction), once again necessitating appropriate and laborious measures.

A further reason why powder coating technology is restricted to a number of selected binder/curing agent systems is that the present-day powder coatings must have glass transition temperatures Tg of >40° C., so as to ensure the resistance to agglomeration of the powder coatings. Indeed, the powder coatings are in general capable of being stored at ambient temperature (generally 25° C.) and of remaining free-flowing if the glass transition temperature of the powder coatings is above the ambient temperature.

The technical problem on which the invention is based, starting from the fact that powder coating represents the only truly environmentally friendly coating process, and in view of the above-described limitation of present-day powder coating technology, is to broaden the scope of application of powder coating technology. Hence it should also be possible to produce relatively thin coatings with a very high surface quality and hiding power in combination with perfect leveling and gloss, without causing any new kind of environmental pollution. In addition it is intended to provide powder coatings based on an expanded range of binder/curing agent. A particular intention is to enable the formulation of powder coatings on the basis of reactive systems, i.e. binder/curing Agent systems which are reactive even at ambient temperature. Finally, it is intended to open up completely new areas of application to powder coating technology, for example the sector of catalyst production.

A process solving this problem is characterized along with developments thereof in the patent claims. Also indicated in the patent claims is a grinding process for the production of the powder to be employed in accordance with the invention, and a powder suspension which is suitable for the powder coating process.

Finally, the invention relates to the application of this process to the production of catalysts.

It is surprising and was unforeseeable that the suspension of various finely divided materials in gas liquefied under a pressure of not more than 20 bar would give suspensions which permit problem-free management and can be employed in a very wide range of sectors. For instance, the suspension according to the invention in the gas liquefied at a pressure of not more than 20 bar can be employed advantageously for all materials which can readily be suspended in the liquefied gas.

DETAILED DESCRIPTION

For the production of the suspensions employed in accordance with the invention, all those liquefied gases are suitable which have been liquefied at a pressure of not more than 20 bar, preferably not more than 10 bar and particularly preferably at normal atmospheric pressure by having been cooled, by methods known to those skilled in the art, to the appropriately low temperatures. Examples which can be mentioned of suitable liquefied gases are liquid nitrogen, liquid air and liquid helium. On account of its ready availability and its low price, liquid nitrogen is employed in particular, although other liquefied gases can also be employed depending on the intended use of the suspensions.

The use of gas which has been liquefied at a pressure of not more than 20 bar ensures that the suspension can be managed without complex equipment for maintaining high pressures, whereas the use of supercritical gases, for example liquefied CO2, requires high pressures to be maintained during preparation, storage, transportation and processing of the suspensions. The use of gases which have been liquefied at a pressure of not more than 20 bar does not, however, of course exclude the possibility that the suspension employed in accordance with the invention is subjected to an elevated pressure, for example during transportation in a closed circular line, it just means that such a pressure is not necessary for maintaining the suspension.

Owing to the low temperatures associated with the use of gas liquefied at a pressure of not more than 20 bar (e.g. $-196°$ C. for liquid nitrogen at atmospheric pressure), the suspensions according to the invention are suitable in particular for materials which are reactive at ambient temperature and which therefore cannot normally be stored/transported and, in some circumstances, cannot even be processed.

In addition, such suspensions in liquefied gas can be employed advantageously for the production of catalysts, especially organometallic catalysts. In this context the active substance is suspended in the liquefied gas and then introduced into the pores of the support substance, and the liquefied gas is then vaporized. This produces catalysts in which the active substance is deposited uniformly in the pores of the support substance. As is usual in the sector of catalyst production, it is of course necessary in this case to test the so-called bleeding behavior, i.e. to ascertain whether the active substance also remains in the pores of the support substance at the reaction temperatures at which the catalyst is used.

The essence of the invention consists in employing a suspension of powder particles, which may also be considerably finer than previously, in a liquefied gas of low viscosity and in heating this suspension, or at least the liquid-gas fraction, during, before or after spraying, until the quantity of heat or energy available is sufficient to vaporize the liquefied gas during spraying. In this way a flowable and sprayable stable powder suspension, in particular a powder coating suspension, is provided which is highly suited to storage and transportation and can be sprayed to give thin coatings of high gloss.

The invention is now described below in more detail by way of example, on the basis of the process of powder coating. It is of course also possible to produce other coatings, for example for the production of catalysts, using this process. This applies especially to all sectors in which it is important to produce coatings having an extremely low layer thickness using powders having an average particle size <15 μm, preferably <10 μm. Examples which can be mentioned are the sectors of coating using metals or adhesives, the doping of surfaces, the production of alloys, the coating (antistatic finishing) of films, the coating of ceramics and the coating of structured bodies, fibers or nonwovens.

The preparation of the powder coating suspension can be carried out in well-insulated supply vessels or stirred vessels, which, in order to maintain good heat insulation, advantageously have a stirrer with magnetic drive for repeated suspension. In order, with a level of liquid which decreases during processing, always to maintain an admission pressure of, for example, 5 bar at the coating nozzles, the stirred vessel is provided not only with a heating means but also with a cooling means. Both are connected to a regulating facility.

The processing of the powder coating is carried out in a manner known per se in that the supply vessel or stirred vessel is connected, either directly or via a thermally well-insulated closed circular line, to one or more spray guns: in the latter case, the circulation of the suspension can be carried out via a circulating pump.

Connected to the stirred vessel or to the closed circular line in a manner known per se are, for example, two-fluid or multifluid nozzles for atomizing the suspension. In the prior-art fluid coating of, for example, car bodies, about 20 spray nozzles are provided. With a coating time of 1 minute per body, the necessary throughput through one die is then 100 g/min of powder coating. At a powder coating density of 1500 kg/m$^3$, the result is a powder coating volume flow of $\dot{v}_p$=0.067 l/min. In accordance with experience, a suspension with a solids content of 25% by volume can be conveyed very readily. As long as certain minimum transportation rates are exceeded, an average particle size of the powder coating of 5 $\mu$m prevents sedimentation of the solid. Consequently, the suspension volume flow to be processed per atomizer nozzle is $$\dot{V}sus = \frac{0.067 \times 60}{0.25} = 16 \text{ l/h}.$$

Such atomization capacities can easily be achieved by commercially available two-fluid nozzles for spray painting. Special two-fluid spray guns are therefore not necessary. At a nozzle admission pressure of approximately 4 bar, on both the liquid side and on the gas side, it would be possible to achieve droplet sizes of 30 $\mu$m with water to be atomized. The significantly lower—in comparison to water—viscosity and surface tension of an inert gas, in particular nitrogen, in the vicinity of its boiling point allow smaller droplet sizes to be achieved in comparison with water. A two-fluid nozzle having the operating data mentioned above requires a gas flow rate of $\dot{v}_g$=170 l/min for the atomization of a volume flow of suspension of $\dot{v}$ sus=16 l/h. If the paint processor employs heated dry air at 4 bar for this purpose, then the two-fluid nozzle can be operated in accordance with the principle, known from power station engineering, of injection cooling, i.e. the two-fluid nozzle can be operated with atomizer air which has been heated such that the amount of heat supplied is sufficient for the practically instantaneous vaporization of the solids-containing nitrogen droplets.

In order to vaporize liquid nitrogen (−196° C.) and to heat it to ambient temperature (25° C.), a heat supply of 1.2 kW per nozzle is required. This quantity of heat can be supplied by preheating the quantity of gas required for atomization to approximately 150° C. The powder coating/gas flow leaving the nozzle then has a temperature of 25° C. Depending on the desired temperature of the powder coating/gas flow, the gas employed for atomization can also be heated to other temperatures. The critical factor, of the quantity of heat introduced by the gas depends not only on the temperature of the atomization gas, but also on the respective quantity of gas. Advantageous temperatures and gas quantities in each case also depend on the respective powder coating and can be determined on the basis of a few routine experiments.

In addition, however, it may also be advantageous to operate the two-fluid nozzle with cooled rather than with heated atomizer air, especially with processing powders which are reactive at ambient temperature. It is thus also possible to supply the quantity of heat required to vaporize the liquid nitrogen and to heat it to ambient temperature not only by supplying a heated atomizer gas. This quantity of heat can also, of course, be supplied in whole or in part by other methods, for example radiant heating.

It should also be ensured when carrying out the process according to the invention that the dew point of the surroundings is not reached, so as to avoid the formation of ice crystals. This can be effected by appropriate heating, for example to 25° C., as is described above. Preferably, however, the coating process according to the invention is carried out in a dry atmosphere (i.e. in an atmosphere having as low as possible an atmospheric humidity). When operating with powder suspensions in liquid nitrogen, powder application is advantageously carried out in a nitrogen atmosphere (in particular, a closed circuit).

The powder coating suspension according to the invention can be applied not only with the commercially available two-fluid nozzle described above but also using a commercially available airless nozzle. In this case it should be ensured by corresponding apparatus, as when employing the two-fluid nozzle and using cooled atomizer air, that the liquid nitrogen is vaporized and heated to ambient temperatures. The quantity of heat required for this can be provided, for example, by means of radiant heating, by means of a heated stream of gas outside the nozzle, or the like.

At a powder coating density of approximately 1500 kg/m$^3$ and a powder/liquid nitrogen suspension having a solids content of 25% by volume, 2 l of liquid nitrogen are to be employed per kg of powder coating. At a bulk purchaser price per liter of DM 0.5/l for liquid nitrogen, the additional cost of the coating process per kg of powder coating is DM 1.00; the cost at a powder coating price of approximately DM 8.00/kg is therefore a rise in the price of feedstocks by approximately 13%.

The new powder coating process permits the use of known and tried components. The process chain can be divided into three substeps: paint production, storage and transportation, and paint processing.

The powder coating is produced on the basis of known powder coating particles, having an average particle size of, for example, about 40–50 $\mu$m. It is, however, also possible to employ powder coatings having markedly greater average particle sizes. This powder is metered from a supply vessel into a mixing vessel and is then suspended in the liquid gas, preferably in liquid nitrogen. As has been ascertained, powder coating particles having an average particle size of 50 $\mu$m can be dispersed in liquid nitrogen with no problems. Paint powder having an average particle size of approximately 50 $\mu$m is thus mixed with liquid nitrogen in a mixer to give a suspension and is then ground finely to the desired particle size. As mentioned, however, it is also possible to suspend powder coatings having a markedly greater particle size and then to grind them to the desired particle size.

Since the liquid nitrogen is in the vicinity of its boiling point of −196° C., its viscosity, at 8.9–10$^{-5}$ nanoseconds per square meter (Ns/m$^2$) (cf. water at 1.10$^{-3}$ Ns/m$^2$), is extremely low. When using stirred ball mills for the fine grinding, for example from the companies Draiswerke or Netzsch, the viscosity of the suspension should not exceed 10 Pas. Because of the low viscosity of liquid nitrogen, a comparatively highly concentrated suspension can therefore be employed. Grinding is carried out until the average particle size is less than 15 μm, preferably from 5 to 10 μm. The suspension thus ground comprising particles having an average particle size of less than 15 μm, preferably of from 5 μm to 10 μm, and liquid nitrogen is then dispensed into thermally well-insulated transportation vessels, which are at the same time the suspension or stirring vessels for redispersion at the premises of the paint processor, and in which the powder coating suspension can also be stored without problems.

In addition, it is also possible to produce the powder coatings by, first of all, adjusting the particle size of the powder coatings (particle size distribution) to the values required, using corresponding grinding equipment, in combination if desired with suitable classifying and screening devices. For example, for the production of powder coatings having a small average particle size of <15 μm, it is possible to employ fluidized-bed jet mills (AFG) from Alpine, Augsburg, in combination if desired with Turboplex ultrafine classifiers from Alpine, Augsburg. Subsequently, these powder coatings having the desired particle-size distribution are then suspended using appropriate mixers or dispersion equipment in the liquid gas, preferably in liquid nitrogen.

In this context it is advantageous, for example, that the binder and the curing agent can be ground separately and the resulting fine particles can be suspended directly in the liquid gas, in particular in liquid nitrogen. This enables the production of powder coatings without an extrusion step.

Since the suspension of the finely ground particles in the liquid gas can be carried out using simple mixing or dispersion equipment, it is even possible to produce the powder coating suspension prior to application at the actual premises of the respective user. This enables, on the one hand, the use of reactive systems, since this variant permits the formulation of powder coatings as two-component systems. On the other hand, a considerably larger scope is provided for variation with regard, for example, to different shades of color, since the pigments as well, in an appropriately finely ground form, can be added to the powder coating actually on site during the preparation of the suspension. It is also possible to regulate many applications properties of powder coatings by appropriate addition of additives. Because no extrusion cut is necessary for the homogeneous incorporation of these additives, powder coatings can be produced in practice by the "building-block" principle. This means that every user can produce the powder coating which is optimum for their purposes, because the individual components (binders, curing agents, pigments, additives etc.) can be supplied in finely ground form and can be processed actually on site by suspension in liquid gas to give the powder coating. In this way, it is also possible to produce relatively small quantities of a specific powder coating in a cost-effective way. In addition, liquid components (curing agents, additives etc.) can also be incorporated into the powder coating without problems in the process according to the invention.

Furthermore, since the powder coating is very simple to suspend because of the low viscosity (and the low surface tension) of the liquefied gas (especially in the vicinity of the boiling point of the liquefied gas), it is also possible to prepare the suspension actually in the nozzle. In airless application, this can be carried out using a commercially available two-fluid nozzle. If operating with the use of atomizer air, processing is carried out accordingly by means of a commercially available three-fluid nozzle which is likewise known.

Depending on the system, however, it may under certain circumstances be quite desirable for the powder coating suspension to be prepared not actually at the premises of the particular user, but directly after the preparation of the powder coating components. The storage and transportation of the new powder coating suspension are then carried out expediently in the insulated transportation vessels which are also used by the paint processor as supply and stirring vessels. Indeed, using this type of storage and transportation, problems in the previous handling of powder coatings are solved at the same time:

Powder coatings contain reactive components which, on being stored for prolonged periods at ambient temperatures, lead to aging of the coating. Because of the low temperature of the powder coating suspension (about −196° C.), however, no such reaction takes place. Consequently, it is even possible to formulate powder coatings which contain components which would react directly at room temperature (about 25° C.), for example powder coatings based on hydroxyl group-containing binders and reactive crosslinkers containing free isocyanate groups. It is also possible to incorporate sensitive constituents, for example aluminum bronzes, into the powder coating without problems and without expensive protective treatment. By this means, powder coating technology is extended to other binder/curing agent systems which were hitherto inaccessible to it.

Moreover, known powder coatings solidify during prolonged transportation, especially transportation by ship, in such a way that their redispersion becomes practically impossible. With the production and storage of the powder coating as are proposed in this document, it is possible in principle to supply paint processors worldwide from one paint production site. Since it has even been possible, for very large storage quantities, for example liquefied natural gas, to set up a refrigeration chain, it is likewise possible for the considerably smaller quantities of powder coating suspension, for example in the form of suitably designed insulated transportation containers, known as insulated vessels.

Finally, the process according to the invention also makes possible the use of powder coatings which have markedly reduced glass transition temperatures Tg. Indeed, so that the current powder coatings retain their long-term flowability, the Tg of the powder coatings must usually be >40° C. By contrast, when the powder coating is stored and transported in liquid nitrogen, powder coatings having markedly lower Tg values, for example <0° C., can also be employed. This opens up new spheres of use to powder coatings. In addition, it is also possible by this means to improve the properties of the powder coatings for specific applications. For example, the leveling of powder coatings with a decreasing Tg is improved markedly, which is of importance, for example, for the use of powder coatings in the sector of the topcoat finishing of automobile bodies. Also possible in this way is the formulation of stone chip-resistant coatings having distinctly improved properties.

On the basis of the abovementioned advantages associated with the use of liquid gas, it is consequently possible to formulate, for example, powder coatings on the following chemical basis:

a) binders containing active hydrogen atoms (e.g. compounds containing OH, NH and SH groups), in combination with compounds which contain free isocyanate groups, b) compounds containing carboxyl groups or amino groups, in combination with compounds containing epoxide groups, c) carbodiimide systems, in combination, for example, with compounds containing carboxyl or amino groups, d) compounds containing amino groups, in combination with compounds containing carbonate groups, e) systems which cure by the principle of Michael Addition, for example compounds containing an activated double bond, in combination with compounds containing active hydrogen, f) binders containing active H atoms, in combination with anhydride systems, g) moisture-curing systems and h) powder coating systems already in general use.

Finally, the process according to the invention for the production of powder coatings has the additional advantage that the fines, i.e. the powder coating particles having a particle size <10 $\mu$m, do not have to be separated off for the production of powder coatings having a small average particle size.

The powder coatings produced in accordance with the invention are suitable for coating a large number of substrates, for example metal, plastic, wood, glass and the like. They are preferably employed for coating metal components, in particular thin-walled metal components of large surface area, and above all car bodies.

The powder coatings are preferably applied by means of electrostatic assistance. Conventionally, the electrostatic charging of the powder coating particles is carried out by applying a high direct voltage in the vicinity of the powder discharge apertures at points or sharp edges on the spray gun. However, it is also possible not to give the powder coating particles an electrostatic charge until after the spray nozzle.

We claim:

1. A process for the production of supported catalysts, comprising the steps of: a) suspending a catalyst active substance in a liquefied gas, producing a suspension, wherein the gas is liquefied at a pressure of not more than 20 bar, b) depositing the suspension into the pores of a catalyst support substance by spraying, and c) vaporizing the liquefied gas.

2. A powder coating suspension, comprising a suspension of powder particles in a gas, wherein the gas is liquefied at a pressure of not more than 20 bar.

3. A powder coating suspension according to claim 2, wherein the powder coating suspension contains a binder/curing agent system comprising a binder component and a curing agent component which react with each other at room temperature.

4. A powder coating suspension according to claim 2, comprising compounds selected from the group consisting of a) binders containing active hydrogen atoms, in combination with compounds which contain free isocyanate groups or anhydride groups, b) compounds containing carboxyl or amino groups, in combination with compounds which contain epoxide groups or carbodiimide groups, c) compounds containing amino groups, in combination with compounds containing carbonate groups, d) systems which cure by the principle of Michael Addition, and e) moisture-curing systems.

5. A process for the preparation of a powder coating suspension according to claim 2, comprising the step of grinding powder particles to an average particle size of not more than 15 $\mu$m by wet grinding in a liquid medium, the liquid medium for the wet grinding being a gas liquefied at a pressure of not more than 20 bar.

6. A process for the preparation of a powder coating suspension according to claim 2, comprising the steps of: (a) preparing powder coating particles of a desired particle size and (b) suspending the powder coating particles in a gas liquefied at a pressure of not more than 20 bar.

7. A process for the production of a powder coating on a substrate, comprising the steps of: (a) spraying a powder coating suspension according to claim 2, (b) vaporizing the liquefied gas, and (c) subsequently depositing the powder coating suspension on to the substrate.

8. A process according to claim 7, wherein the liquefied gas employed for the suspension of the powder particles is under a pressure of not more than 10 bar.

9. A process according to claim 7, further comprising a step of heating the suspension indirectly prior to spraying.

10. A process according to claim 7, further comprising a step of heating the suspension directly by at least one method selected from the group consisting of: radiant heating and mixing the suspension with a heated stream of gas during spraying.

11. A process according to claim 10, comprising a step of mixing the suspension and the heated stream of gas in a two-fluid nozzle.

12. A process according to claim 10, wherein the suspension is sprayed in a two-fluid nozzle with a stream of atomizing gas, and further wherein a second heated stream of gas vaporizes the liquefied gas.

13. A process according to claim 11, further comprising a step of carrying out an adjustment of an admission pressure of the suspension at the two-fluid nozzle by controlled heating or cooling of an insulated suspension supply vessel, from which the suspension is supplied to the two-fluid nozzle.

14. A process according to claim 7, further comprising a step of carrying out storage and transportation of the powder coating suspension between a powder manufacturer and a processor in insulated transportation vessels which contain the powder coating suspension.

15. A process according to claim 7, further comprising a step of: preparing the suspension of the powder particles in the liquefied gas in a two-fluid nozzle and vaporizing the liquefied gas by a method selected from the group consisting of indirect heating, direct radiant heating, mixing the suspension in the nozzle with a cooled stream of gas during spraying, and heating with a heated stream of gas after spraying.

16. A process according to claim 7, wherein the powder particles have an average particle size of not more than 15 $\mu$m.

17. Process according to claim 16, wherein the powder particles have an average particle size of not more than 10 $\mu$m and a maximum particle size of not more than 20 $\mu$m.

18. A process according to claim 7, wherein the viscosity of the liquefied gas is $<5.10^{-4}$ Ns/M$^2$.

19. A process according to claim 7, comprising the steps of: (a) electrostatically charging the powder coating particles and (b) directing the powder coating particles onto a metallic substrate.

20. A powder coating suspension according to claim 2, wherein the gas is nitrogen gas.

21. The process according to claim 5, wherein powder particles are wet ground in a stirred mill.

22. The process according to claim 5, wherein the liquid medium for wet grinding is nitrogen.

23. The process according to claim 5, wherein the liquefied gas is liquefied at atmospheric pressure.

24. Process according to claim 7, wherein the viscosity of the liquefied gas is $<10^{-4}$ Ns/m$^2$.

25. A process according to claim 12, comprising a step of carrying out an adjustment of an admission pressure of the suspension at the two-fluid nozzle by controlled heating or cooling of an insulated suspension supply vessel, from which the suspension is supplied to the two-fluid nozzle.

\* \* \* \* \*